United States Patent [19]

Shimaoka et al.

[11] Patent Number: 4,710,829
[45] Date of Patent: Dec. 1, 1987

[54] DISK LOADING MECHANISM FOR RECORDING AND REPRODUCING APPARATUS

[75] Inventors: Motohiro Shimaoka; Yukio Saito, both of Furukawa, Japan

[73] Assignee: Alps Electric Co., Ltd., Japan

[21] Appl. No.: 4,839

[22] Filed: Jan. 13, 1987

Related U.S. Application Data

[63] Continuation of Ser. No. 569,671, Jan. 10, 1984, abandoned.

[30] Foreign Application Priority Data

Jan. 11, 1983 [JP] Japan ............................. 58-1296[U]

[51] Int. Cl.[4] ............................................. G11B 5/012
[52] U.S. Cl. ......................................... 360/97; 360/99
[58] Field of Search .................. 360/96.5, 96.6, 97, 360/99, 86, 130.34, 133, 88; 369/261, 262, 270

[56] References Cited

U.S. PATENT DOCUMENTS

| | | | |
|---|---|---|---|
| 4,454,599 | 6/1984 | Tsuchiya | 360/133 |
| 4,509,158 | 4/1985 | Kang | 360/133 |
| 4,562,498 | 12/1985 | Shibata | 360/99 |

FOREIGN PATENT DOCUMENTS

| | | | |
|---|---|---|---|
| 2809060 | 9/1979 | Fed. Rep. of Germany | 360/99 |
| 0059115 | 5/1979 | Japan | 369/261 |
| 0070962 | 5/1980 | Japan | 360/96.5 |
| 0108003 | 6/1983 | Japan | 360/96.5 |
| 0094160 | 6/1983 | Japan | 360/96.5 |

Primary Examiner—Robert S. Tupper
Assistant Examiner—Andrew L. Sniezek
Attorney, Agent, or Firm—Guy W. Shoup

[57] ABSTRACT

A recording and reproducing apparatus using a disk cartridge includes a cartridge holder in which the cartridge is received, a pivotable shutter, and a receiving portion mounted to the front end of the holder and coming into engagement with the shutter. The body of the apparatus is provided with an opening to allow insertion of the cartridge into the apparatus. The shutter is always biased in such a direction as to cover the opening, and is centrally provided with an extension which comes into engagement with the receiving portion, so that the holder is not operatively connected with the apparatus until the shutter is opened.

4 Claims, 4 Drawing Figures

DISK LOADING MECHANISM FOR RECORDING AND REPRODUCING APPARATUS

This is a continuation application from application Ser. No. 569,671 filed Jan. 10, 1984 now abandoned.

FIELD OF THE INVENTION

The present invention relates to a recording and reproducing apparatus using a disk cartridge.

BACKGROUND OF THE INVENTION

Recently, a recording and reproducing apparatus has been developed the body of which has a cartridge holder for housing a disk cartridge and an opening for allowing insertion of the cartridge into the body. More specifically, the cartridge which is molded out of a hard material and holds a magnetic disk rotatably is inserted into the body through the opening, and then it is received in the cartridge holder in the body. Eventually, the cartridge is operatively connected with the apparatus for effecting recording or reproduction. The aforementioned opening of this apparatus is covered with a shutter to prevent dust from intruding into the body of the apparatus. The cartridge holder is required to be disposed near the opening through which the cartridge is inserted such that the cartridge is guided by the holder while it is being inserted. In order to place the cartridge in position within the apparatus, the shutter is first opened. Then, the cartridge is inserted into the cartridge holder. Thereafter, the holder must be brought into operative condition. At this time, the operation for opening the shutter may initiate movement of the cartridge holder, if the shutter makes contact with the holder.

SUMMARY OF THE INVENTION

Accordingly, it is the main object of the present invention to provide a recording and reproducing apparatus in which the cartridge holder is not operatively connected with the apparatus until the shutter is opened, thus solving the foregoing difficulty with the prior art apparatus.

This object is achieved, in accordance with the invention, by providing an apparatus which has a cartridge holder, an opening through which a cartridge is inserted, a pivotable shutter always biased in such a direction as to cover the opening, and a receiving portion mounted at the front end of the holder and coming into engagement with the shutter, one portion of the shutter having an extension which can bring the inner side of the receiving portion into engagement with the shutter while the receiving portion is being moved by the vertical motion of the holder.

Other objects and features of the invention will appear in the course of the description thereof which follows.

DETAILED DESCRIPTION OF THE INVENTION

Figure 1:
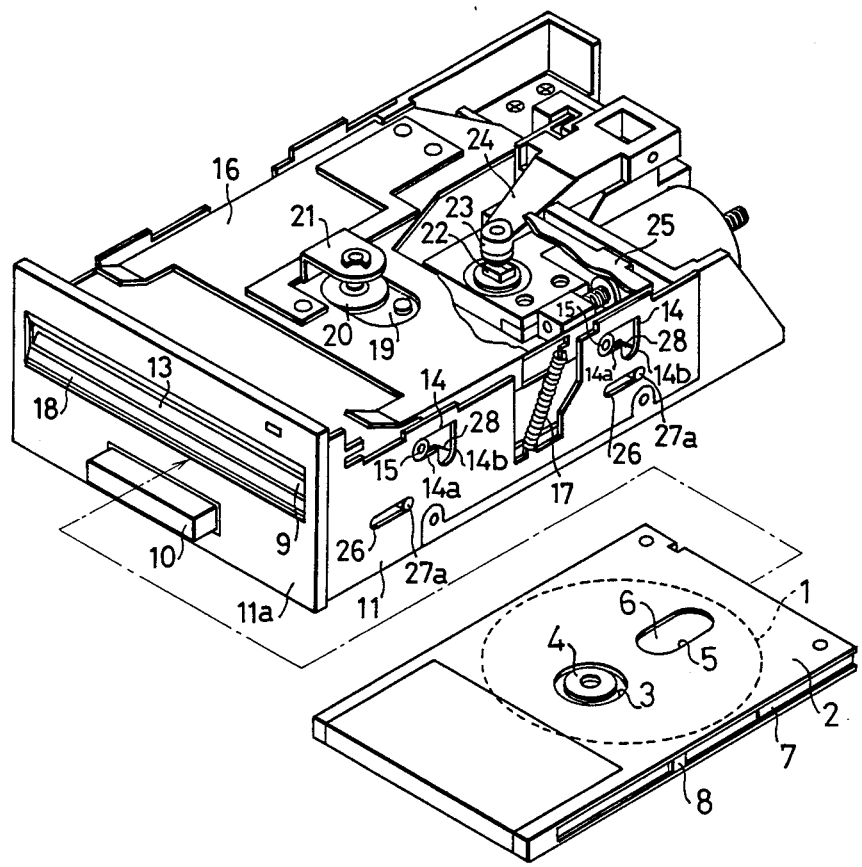
FIG. 1 is a schematic perspective view of a recording and reproducing apparatus according to the present invention.

Referring to the drawings, there is shown a recording and reproducing apparatus embodying the concept of the invention, as well as a disk cartridge 2 to be inserted in the apparatus. The cartridge 2 is molded out of a hard synthetic resin and houses a magnetic disk 1 rotatably therein. The cartridge 2 is centrally provided with a hole 3 extending through it, and a hub 4, which grips and holds the center of the disk 1, extends through the hole 3 and hence it is uncovered. At a given position, the cartridge is also formed with an opening 5 through which a magnetic head (described later) is inserted. A closing member 6 made of a metal plate is rotatably disposed below the opening 5. Grooves 7 are formed on opposite sides of the cartridge 2, and an element 8 for operating the closing member 6 is disposed in one of the grooves 7 so as to be slidable therein.

Figure 2:
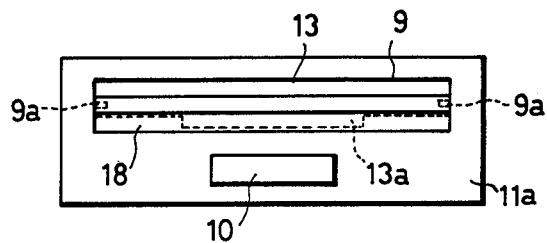
FIG. 2 is a front elevation of the apparatus of FIG. 1.
Figure 3:
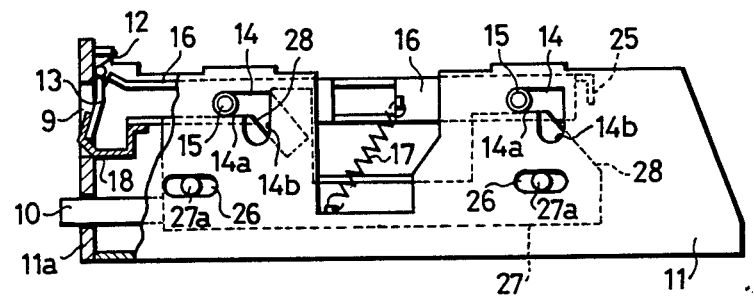
FIG. 3 is a side elevation partially in section of the main portions of the apparatus shown in FIG. 1 when it is not operated.

The body 11 of the recording and reproducing apparatus has a front frame 11a which is provided with an opening 9 for insertion of the cartridge. The front frame is also provided with an eject button 10. As shown in FIG. 2, a pair of pins 9a is disposed immediately at the back of the opening 9 and protrudes into their respective grooves 7 in the cartridge 2. One of the pins 9a engages with the element 8 for operating the closing member 6 to open the member 6. A pivotable shutter 13 is pivotally secured to the inner side of the front frame 11a near the opening 9 and is always biased in such a direction as to cover the opening 9 by a coiled spring 12. Further behind the opening 9, a cartridge holder 16 having rollers 15 on its sides is mounted. These rollers 15 are guided by their respective angular holes 14 formed in opposite side walls of the body 11. Tension springs 17 are disposed between the holder 16 and the body 11 to invariably bias the holder 16 toward the front frame 11a and downwardly. When the disk cartridge 2 is not inserted, the springs 17 urge the rollers 15 into the foremost positions of the horizontal portions 14a of the holes 14 as shown in FIG. 3. The front end of the holder 16 has a receiving portion 18 which has a contour like letter "U" when viewed from a side. The front end of the receiving portion 18 faces on the lower portion of the opening 9. The inner side of the receiving portion 18 is in resilient contact with the front wall of the pivotable shutter 13 which is subject to the resilience of the coiled spring 12. An extension 13a to the shutter 13 depends from the central portion of the shutter. As a result, the side ends of the shutter 13 will not abut on the pins 9a when the shutter 13 rotates inwardly of the body 11. Further, the extension 13a can always engage with the inner side of the receiving portion 18 even if the vertical movement of the cartridge holder 16 shifts the receiving portion 18 as described later.

A pressing portion 20 for pressing the hub 4 of the disk 1 against the turntable 19 of the apparatus is held by a support 21 above and in front of the cartridge holder 16, as shown in FIG. 1. The rear upper surface of the holder 16 has a contact portion which moves up an arm 24 equipped with a pad 23 relative to the magnetic head 22 when the rollers 15 of the holder 16 are in the horizontal portions 14a of the angular holes 14. The rear end of the holder 16 has a portion 25, which is bent downwardly and comes into contact with the front end of the cartridge 2.

Connected to the aforementioned eject button 10 are members 27 for pushing up the rollers. The members 27 has pins 27a at their sides, the pins 27a being guided by long holes 26 formed in the side walls of the body 11. The members 27 has inclined portions 28 which can abut on the rollers 15 in the vertical portions 14b of the angular holes 14.

Thus, when the disk cartridge 2 is inserted into the body 11 through the opening 9, the rotary shutter 13 is rotated inwardly against the action of the coiled spring 12. This causes the pin 9a to be inserted into the groove 7 in the cartridge 2, and then the pin comes into contact with the element 8, thus opening the closing member 6. Subsequently, the cartridge 2 is inserted into the cartridge holder 16, pressing the bent portion 25. Since the rollers 15 have reached the vertical portions 14b of the holes 14, the resilience of the tension springs 17 moves the rollers 15 down in the vertical portions 14b. At the same time, the holder 16 is moved down and is operatively connected with the apparatus, thereby permitting the pressing portion 20 mounted to the holder 16 to press the hub 4 of the disk 1 against the turntable 19. Thus, the disk 1 is allowed to turn. Meanwhile, the opening 5 for insertion of the magnetic head in the cartridge 2 is open. Therefore, the lowering of the holder 16 moves the pad 23 mounted to the front end of the arm 24 downward to the magnetic disc through the opened shutter 6. Then, the pad 23 presses the disk 1 on the magnetic head 22, whereby permitting the apparatus to effect recording and reproduction.

Figure 4:
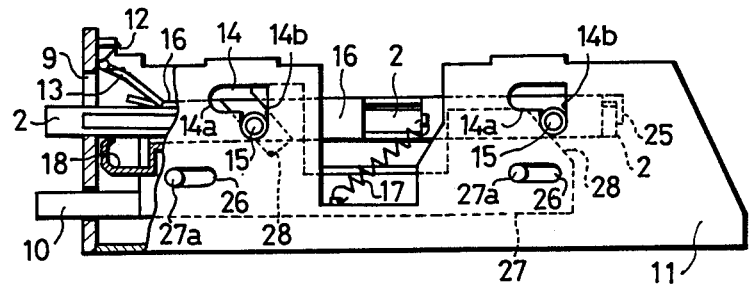
FIG. 4 is a side elevation partially in section of the main portions of the apparatus shown in FIG. 1 when it is being operated.

During the operation described above, the pivotable shutter 13 is in resilient contact with the upper surface of the cartridge 2 by the resilience of the coiled spring 12 as shown in FIG. 4, and the receiving portion 18 of the holder 16 is located in the region where the extension 13a can rotate. Accordingly, should the cartridge 2 be brought out, while it is operatively connected with the apparatus, the extension 13a is able to engage the inner side of the receiving portion 18.

In order to disconnect the holder 16 from the apparatus operatively, the eject button 10 is pressed inwardly. This causes the inclined portions 28 of the members 27 to push up the rollers 15 located in the lower portions of the vertical portions 14b of the holes 14. Thus, the rollers 15 are moved upward while held between the inclined portions 28 and the vertical portions 14b until they reach the horizontal portions 14a, whereupon the rollers 15 disengage from their respective inclined portions 28. Then, the rollers 15 are moved into the foremost positions of the horizontal portions 14a by the action of the tension springs 17. This movement of the rollers 15 elevates the holder 16 toward the opening 9, with the result that the holder 16 is restored to the condition prior to the operative connection.

The holder 16 is now positioned in the forward, upper position relative to the opening 9. As the cartridge is withdrawn, the biased shutter 13 and receiving portion 18 both move to follow the retreating end of the cartridge as it moves out of the opening 9. Then, if the cartridge 2 is taken out, the resilience of the springs 12 brings the pivotally shutter 13 into resilient contact with the inner side of the receiving portion 18 of the holder 16 which is located at the opening again, and the extension 13a of shutter 13 once again presses against the inner side of the receiving portion 18 to close the opening 9.

In this way, the shutter 13 comes into engagement with the inner side of the receiving portion 18, and therefore the holder 16 is not operated until the shutter 13 is opened. If the shutter 13 were engaged with the external side of the receiving portion 18, application of a pressure to the shutter would also push the holder 16, bringing the holder into the operatively connected condition with the apparatus. Such an undesirable situation will not arise in the novel apparatus.

As the novel apparatus is constructed as described hereinbefore, the cartridge holder cannot be moved together with the disk cartridge for operative connection until the shutter is opened. Hence, the operation of the apparatus is stable and certain.

It should also be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:

1. A recording and reproducing apparatus comprising:
    a body having an opening at a forward portion thereof to allow insertion of a disk cartridge into the apparatus;
    a movable cartridge holder disposed inwardly of the opening at an insertion position for receiving a disk cartridge inserted through the opening;
    means within the apparatus for moving the cartridge holder inwardly and downwardly to an operative position within the apparatus when the cartridge has been fully inserted in the holder, and for moving the holder upwardly and forwardly to the insertion position when the cartridge is to be ejected;
    a pivotable shutter having an end pivotally mounted to the body of the apparatus on one side of the opening and having its free end pivotally movable to close at least a portion of the opening;
    means biasing the shutter to close said portion of the opening when the cartridge is removed from the holder and withdrawn through the opening; and
    a receiving portion on the forward end of the holder which is disposed on an opposite side of the opening from the shutter when the holder is in the insertion position, said receiving portion having an end which is pressed back upon insertion of the cartridge into the holder and, when the cartridge is to be ejected, said end of the receiving portion springing forward and being engaged on an inner surface thereof by the free end of the pivotable shutter as the cartridge is withdrawn from the holder through the opening such that the opening is closed by the combination of said shutter and said receiving portion,
    whereby said receiving portion of the cartridge holder engaged on its inner surface by the end of the shutter at the insertion position prevents movement of the holder to the operative position unless a disk cartridge is first inserted in the holder to push said pivotable shutter back away from engagement with the inner surface of said end of said receiving portion.

2. A recording and reproducing apparatus as set forth in claim 1, wherein said receiving portion is shaped like letter "U" and disposed at a lower portion of the opening with respect to the pivotal shutter.

3. A recording and reproducing apparatus as set forth in claim 1, wherein the free end of the shutteer is centrally provided with an extension which comes into engagement with said receiving portion.

4. A recording and reproducing apparatus as set forth in claim 1, wherein the body of the apparatus is provided with angular holes cooperating with said moving means to guide the cartridge holder in the apparatus.

* * * * *